United States Patent [19]

Hedlund et al.

[11] 4,273,404

[45] Jun. 16, 1981

[54] RESILIENTLY SUPPORTED ELECTRICAL FLOOR INSTALLATION

[75] Inventors: Rolf E. Hedlund, New York; Thomas J. Hynes, Brentwood, both of N.Y.

[73] Assignee: Scanorama, Inc., New York, N.Y.

[21] Appl. No.: 61,821

[22] Filed: Jul. 30, 1979

[51] Int. Cl.³ .......................................... H01R 33/12
[52] U.S. Cl. ................................. 339/93 R; 174/57
[58] Field of Search ................... 339/34, 93 R, 93 C, 339/64 R, 64 M; 174/48, 57, 58

[56] References Cited

U.S. PATENT DOCUMENTS

| 892,755 | 7/1908 | Mayer | 339/44 R |
|---|---|---|---|
| 1,933,358 | 10/1933 | Almcrantz | 174/57 |
| 2,183,872 | 12/1939 | Rowe | 174/57 |

Primary Examiner—Neil Abrams
Attorney, Agent, or Firm—Watson, Leavenworth, Kelton & Taggart

[57] ABSTRACT

An electrical installation in a floor of a building for providing electrical power to telephones, computer terminals and other electrical equipment has a floor plate mounted substantially flush with the floor of the building. The installation comprises an insulative housing including a connector for making electrical connection to the electrical equipment and to a source of electrical power beneath the floor. The housing is resiliently supported beneath the floor plate so that upon application of a load, the housing yieldably displaces under the load to prevent damage to the housing and connector.

3 Claims, 4 Drawing Figures

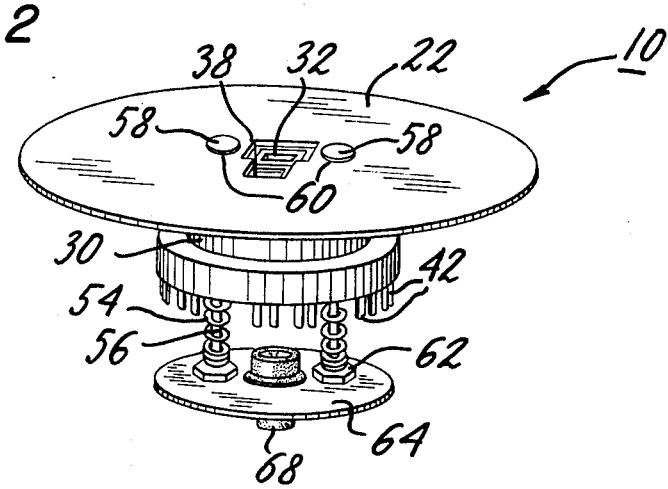
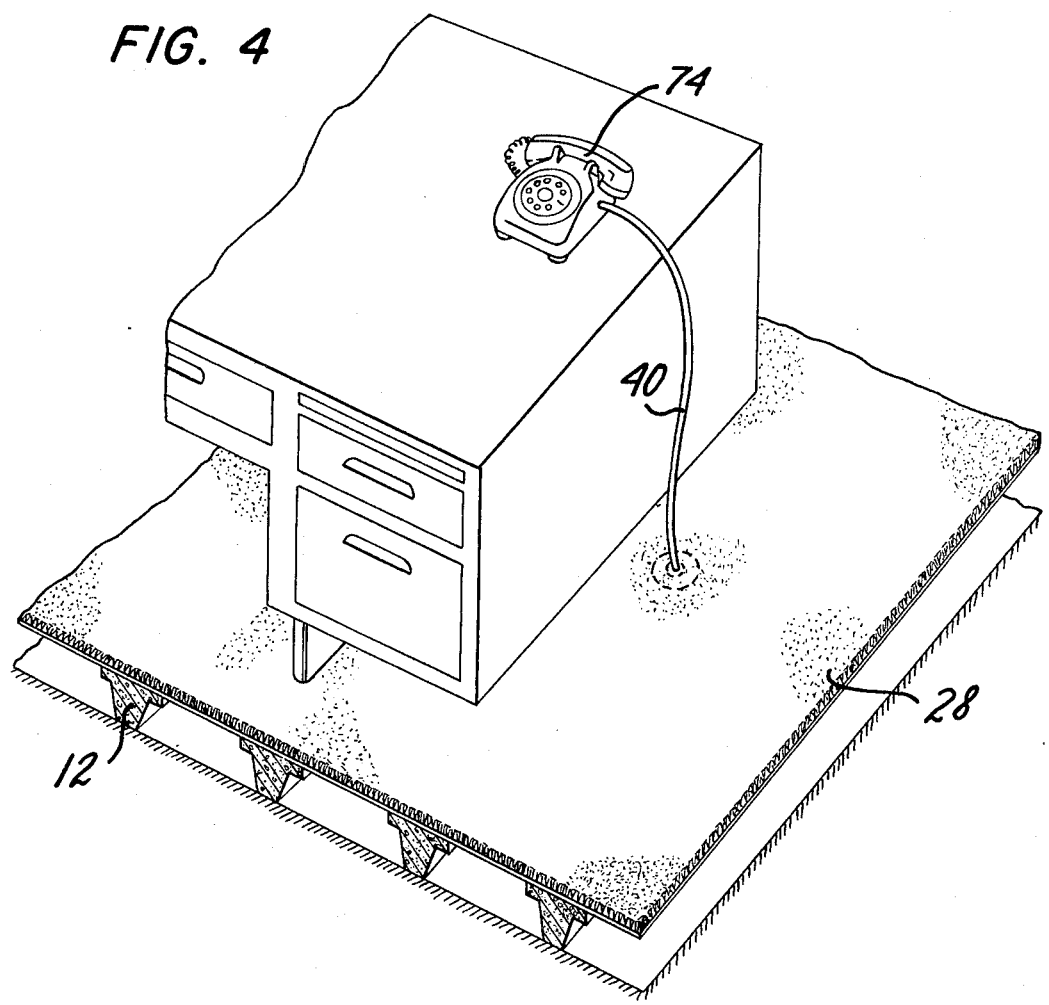

RESILIENTLY SUPPORTED ELECTRICAL FLOOR INSTALLATION

BACKGROUND OF THE INVENTION

1. Field of the Invention

This invention relates to an electrical installation in a floor of a building for making electrical connections therein and more particularly to a flush mounted electrical installation having resiliently supported connector means.

2. Description of the Prior Art

Electrical installations for providing electricity to telephones, computer terminals, typewriters and a wide variety of electrical devices have been used in commercial and industrial buildings and schools for many years. With the advent of computer systems, video displays and other electronic equipment, flexibility in the use and planning of wiring systems in buildings has become a concern for engineers and architects.

Many buildings are now provided with underfloor ducts in which raceways of electrical cables are embedded in the concrete fill of the building. The advantage of this type of construction is that electrical outlets can usually be provided in an area where it is more efficient and practical to place electrical equipment and devices, thus facilitating office layout and planning.

Recently there has been considerable attention directed to the cosmetics of office layouts, in particular, electrical outlets. In some floor systems, preset flush outlets are provided that allow power cords and telephone wires to penetrate the floor almost unobtrusively. Those outlets can be fully concealed by carpeting. Plastic covers or flip-up lids are generally used with these flush service arrangements. The covers or lids typically cover an aperture that is provided in the floor for access to the power or telephone lines. Grommets are sometimes used to hold in place the wires that are fitted through the covers or lids.

One problem with these flush type arrangements is the reduction in the strength of the floor at the location of the lid or cover. At times the electrical installations are stepped-on and relatively heavy items are placed on the covers. Under such loads, plastic covers have a tendency to crack or break which can lead to damage of the electrical connectors and potential shut-down of the equipment and/or fires. Such an installation construction would thus seem to undesirably present certain hazardous conditions that various building code regulations require be prevented or minimized. Installing these arrangements in such a manner so as to avoid the application of usual office loads would disadvantageously limit the flexibility of the layout of equipment and devices.

It is therefore desirable, in particular with flush service systems, to provide an electrical installation that is capable of supporting typical loads without harmful damage to the installation or the electrical connections.

SUMMARY OF THE INVENTION

In accordance with the present invention, an electrical installation for making electrical connections in a floor of a building is provided. The installation comprises a floor plate of relatively thin, substantially flat, rigid material adapted to cover in the floor an aperture that is provided for access to a source of electrical power beneath the floor. The periphery of the plate is mounted on the surface portion of the floor defining the aperture. The plate has an opening for receiving the plug of a cable connected to an electrical device above the floor. Mounted beneath the plate is connector means having first means for receiving and making connection with the plug and second means for making connection to the electrical source.

Included is means attached to the plate for resiliently supporting the connector means so that upon application of a load to the connector means through the opening, the connector means yieldably displaces under the load.

DESCRIPTION OF THE DRAWING

FIG. 2 is a perspective view of the electrical installation of FIG. 1.

FIG. 4 is a perspective view, partly in section, showing a preferred embodiment of the invention as a telephone installation.

DETAILED DESCRIPTION OF THE PREFERRED EMBODIMENT

Figure 1:
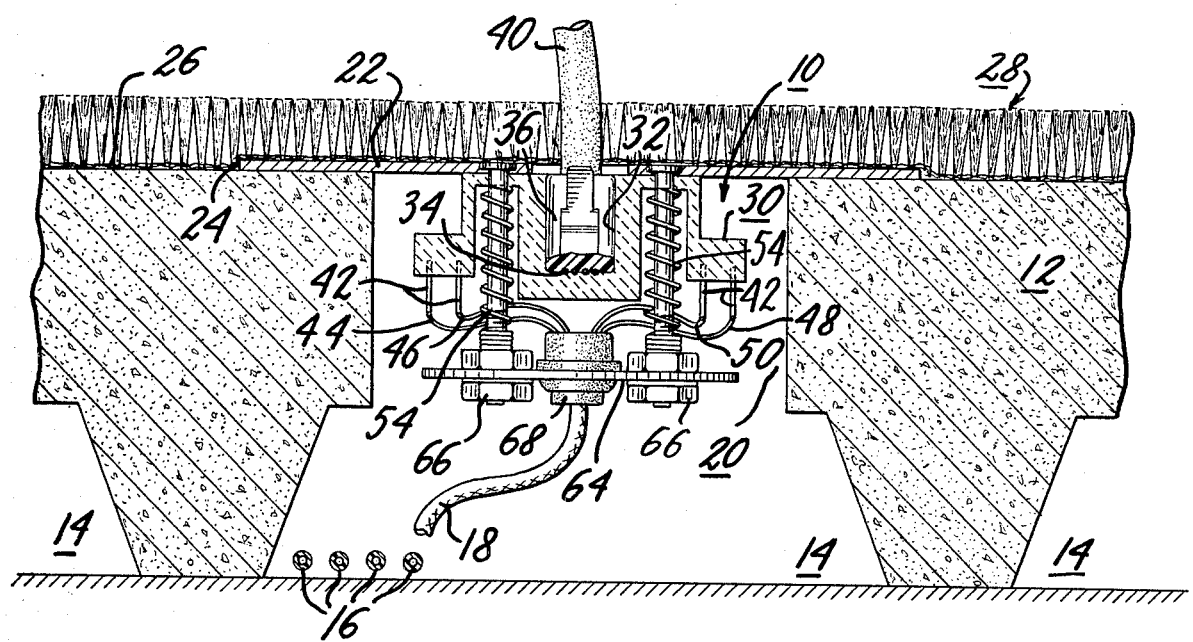
FIG. 1 is a side elevational view partly in section, showing the electrical installation of the present invention as installed in a concrete floor in a building.

Referring to the drawing, there is shown in FIGS. 1 and 2 an electrical installation 10 that is mounted in a floor 12 of a building. In the particular floor construction shown, the floor 12 is concrete wherein underfloor ducts 14 are formed to contain a source of electrical power, such as cables 16, that run throughout the building, cables 16 being connected to external sources (not shown). In accordance with the invention, one or more of the cables 16 are connected to the installation 10 as by a connector cable 18 so that electrical power may be provided to electrical devices above the floor, as will be described. Although the installation 10 is described herein with respect to concrete flooring, it should be understood that other floor systems, such as, for example, raised floors, may also be utilized with the present invention.

An aperture 20 is typically formed in the floor 12 to provide an access to the power cables 16. According to the invention, the installation 10 comprises a floor plate 22 that is adapted to cover the aperture 20 when the installation 10 is mounted into position. The plate 22 is preferably substantially circular although other geometric shapes may be utilized. The periphery 24 of the plate 22 is formed to have a circumference large enough to cover the aperture 20 so that when the installation 20 is in place, the periphery 24 lies on the upper surface 26 of the floor 12 defining the aperture 20. The plate 22 is relatively thin and substantially flat and is made of stainless steel, aluminum or other suitable rigid materials. The plate 22 is preferably formed to have a thickness on the order of 0.040 inch (1.016 mm) or less so that when mounted over the aperture 20, the plate 22 is substantially flush with the upper surface 26 of the floor 12. Thus, a carpet 28 may be readily placed over the plate 22 to conceal the installation 10 with little protrusion of the plate 22 into the carpet.

The electrical installation 10 according to the present invention further comprises an insulative housing 30 that is mounted beneath the floor plate 22. The housing 30 is preferably made of ceramic although other insulative materials may be used. A receptacle 32 having electrical elements 34 is formed in the housing 30 to receive and make electrical connection with a plug 36. An opening 38 is formed through the plate 22, in substantial alignment with the receptacle 32 so that the plug 36 may be received by and inserted into the receptacle 32. The plug 36 is attached to an electrical cable 40 that conducts electrical power to an electrical device above the floor. A suitable slot (not shown) is formed in the carpet 28 to allow the cable 40 and plug 36 to penetrate through the carpet 28 to make the desired connection. In the preferred embodiment, the depth of the receptacle 32 is formed so that when the plug 36 is inserted, the top of the plug 36 is at least flush with or below the upper surface of the plate 22.

The electrical elements 34 of the receptacle 32 are electrically connected to a plurality of terminals 42 that are insulatively disposed around the housing 30. Selected wires, for example, 44, 46, 48 and 50 from the cable 18 are electrically connected to respective terminals 42 as by soldering or by other suitable joining means. Thus, the electrical power from the building cables 16 is electrically connected to the terminals 42 and then in turn through the receptacle 32 for conduction through the plug 36 to electrical devices above the floor.

In accordance with the invention, the insulative housing 30 is resiliently supported, preferably by a pair of helical-type springs 54, although other spring arrangements may be used. The springs may be formed of cadmium plated music wire or other suitable spring materials. In one arrangement, for example, the springs 54 may be selected to have a spring factor, K, of about 0.0625 inch/ounce (4.50 cm/gram) with a spring wire diameter of about 0.028 inch (0.71 mm). A pair of rods 56 are provided for mounting the housing 30 on the springs 54. A pair of apertures are formed through the plate 22 in substantial register with a pair of apertures formed through the housing 30 to slidably receive the shafts of the rods 56. One end of each rod 56 is formed with a substantially flat head 58 that engages a shoulder 60 formed in substantial register with each of the apertures in the plate 22 so that the heads 58 will abut the shoulder 60 and not pass through the apertures in the plate 22. The helical springs 54 are selected to have an inner diameter that permits the springs 54 to axially slide over the rods 56. The apertures in the housing 30 are formed to have a diameter smaller than the outer diameter of the springs 54 so that the springs 54 will not pass therethrough and will abut against the underside of the housing 30 when axially placed on the rods 56. In the preferred embodiment, the springs 54 are retained on the rods 56 by a pair of nuts 62 engaging a threaded portion of each rod end opposite the flat head 58. The rods 56 may be further connected to a lower plate 64, the purpose of which will be detailed, as by a pair of nuts 66. A grommet 68 may be mounted in the plate 64 to retain the connector cable 18. In the arrangement thus described, the housing 30 is disposed between the springs 54 and the lower surface of the floor plate 22. The nuts 62 may be tightened as desired to compressively prestress the springs 54 so that the housing is resiliently urged into contact with the lower surface of the plate 22.

Figure 3:
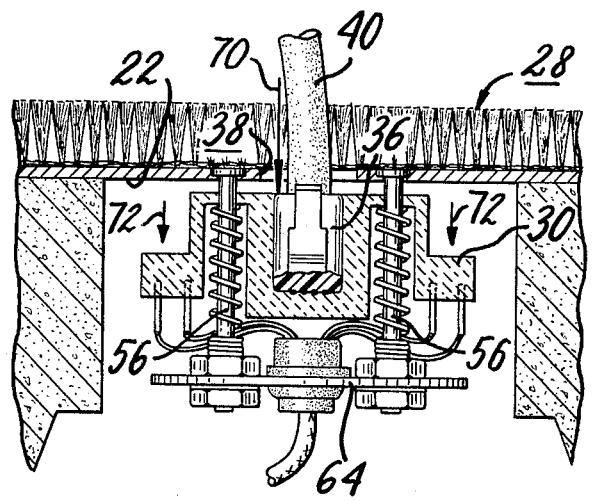
FIG. 3 is a partial view of the installation of FIG. 1 showing the displacement of the connector means under the application of a load.

The electrical installation 10 as herein described is capable of withstanding, without harmful damage, typical loads that may be applied during usual office use. Such loads may be caused by people stepping on the installation or by objects such as chair legs being placed on it. As shown in FIG. 3, when a load is applied to the installation so that most or all of the load as shown by the arrow 70 is applied through the opening 38 onto the plug 36, the housing 30 will yieldably displace downward over the rods 56 and away from the plate 22 in the same direction as the load as shown by the arrows 72. This "floating" feature of the housing 30 resiliently supported by the springs 54 minimizes or prevents deleterious damage to the plug 36 and housing 30 under the application of such loads.

It should be noted that the resilient mounting of the housing 30 may be achieved without the lower plate 64, although the plate 64 desirably provides additional support and stability to the rods 56, particularly under loads that may be angularly applied. The plate 64 also serves as a means to protect the connection of the wires to the terminals 42 and can be formed as a cup or other suitable shapes. Oftentimes in underfloor ducts it becomes necessary to feed cables to other installations. Typically this is achieved by way of "snake-like" devices to carry or pull the cables through the ducts to the desired installation location. The lower plate protects the connections in the installation from being damaged or disconnected during such feed-through operations.

In the preferred embodiment of the invention, the electrical installation 10 is used to make an electrical connection to a telephone 74, as shown in FIG. 4. In such an installation, the telephone plug is connected beneath the carpet 28 and unsightly protrusions and hazardous conditions are minimized if not eliminated. While it is preferable to utilize the present invention in low voltage applications such as with telephones, word processing machines, cathod ray tubes and the like, it should be appreciated that higher voltage devices such as, for example, typewriters, coffee machines and pencil sharpeners, may also be used with the electrical installation as described herein.

What is claimed is:

1. An electrical installation for making electrical connections in a floor of a building comprising:
   a floor plate of relatively thin, substantially flat rigid material adapted to cover in said floor an aperture for access to a source of electrical power beneath the surface of said floor, the periphery of said plate being adapted for mounting on the surface portion of the floor defining said aperture, said plate having an opening for receiving the plug of a cable connected to an electrical device;
   connector means mounted beneath said plate, said connector means having first means for receiving and making connection with said plug and having second means for making connection to said electrical source; and
   means attached to said plate for resiliently supporting said connector means so that said connector means may be displaced away from said plate by a load less than the load required to damage said connector means,
   said connector means comprising an insulative housing, said first means including a receptacle having electrical elements therein for making electrical contact with said plug, said receptacle being substantially aligned with said opening for receiving said plug, said means for supporting comprising spring means, said spring means comprising a pair of helical-type springs, said means for supporting comprising a pair of rods extending axially through said helical type springs and through a pair of apertures provided in said housing, said apertures in said housing each being formed so that said springs do not pass therethrough such that in response to the application of said load said housing slides over said rods resiliently on said springs, said means for supporting also including means for retaining said springs on said rods and means for directly attaching one end of each of said rods to said plate.

2. An electrical installation according to claim 1, further including a lower plate firmly attached to said rods so that said springs and said electrical terminals are disposed between said housing and said lower plate.

3. An electrical installation according to claim 2, wherein said lower plate comprises means for retaining electrical cables for connection to said electrical terminals and to said electrical source.

* * * * *